(12) United States Patent
Sun et al.

(10) Patent No.: US 9,479,237 B2
(45) Date of Patent: Oct. 25, 2016

(54) VECTOR SELECTION MODULATION-BASED MULTI-ANTENNA TRANSMISSION METHOD, RECEIVING METHOD AND DEVICE

(71) Applicant: ZTE CORPORATION, Shenzhen, Guangdong Province (CN)

(72) Inventors: Yunfeng Sun, Shenzhen (CN); Xun Yang, Shenzhen (CN); Junfeng Zhang, Shenzhen (CN); Yu Ngok Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/404,065

(22) PCT Filed: May 6, 2013

(86) PCT No.: PCT/CN2013/075200
§ 371 (c)(1),
(2) Date: Nov. 26, 2014

(87) PCT Pub. No.: WO2013/189211
PCT Pub. Date: Dec. 27, 2013

(65) Prior Publication Data
US 2015/0146817 A1    May 28, 2015

(30) Foreign Application Priority Data

Jun. 19, 2012   (CN) .......................... 2012 1 0203447

(51) Int. Cl.
*H04L 5/00*       (2006.01)
*H04B 7/04*       (2006.01)
(Continued)

(52) U.S. Cl.
CPC .......... *H04B 7/0456* (2013.01); *H04B 7/0473* (2013.01); *H04B 7/0691* (2013.01); *H04L 5/0023* (2013.01); *H04L 27/2627* (2013.01); *H04B 7/068* (2013.01); *H04L 27/2634* (2013.01)

(58) Field of Classification Search
CPC .. H04B 7/0456; H04B 7/0473; H04B 7/068; H04B 7/0691; H04L 27/2627; H04L 5/0023; H04L 27/2634
See application file for complete search history.

(56) References Cited

U.S. PATENT DOCUMENTS

| 8,477,858 B2 * | 7/2013 | Ketchum | .............. H04L 1/0009 370/204 |
| 2003/0201936 A1 * | 10/2003 | Kim | ..................... H04B 7/0408 342/372 |

(Continued)

FOREIGN PATENT DOCUMENTS

| CN | 102017489 A | 4/2011 |
| CN | 101729210 A | 6/2011 |
| CN | 102394678 A | 3/2012 |

*Primary Examiner* — Jean B Corrielus
(74) *Attorney, Agent, or Firm* — Ling Wu; Stephen Yang; Ling and Yang Intellectual Property

(57) ABSTRACT

Provided is a vector selection modulation-based multi-antenna transmission method, including: for a group of data to be transmitted, using part of bit information in the group of data to select a weight corresponding to the group of data from K preconfigured weights; and performing constellation mapping modulation on residual bit information in the group of data, and using the selected weight corresponding to the group of data to weight the group of data after the constellation mapping modulation, wherein, the K is a natural number. Based on the method of the present document, the spectrum efficiency of the system can be greatly improved under the condition without adding a transmission antenna.

16 Claims, 6 Drawing Sheets

(51) Int. Cl.
*H04L 27/26* (2006.01)
*H04B 7/06* (2006.01)

(56) References Cited

U.S. PATENT DOCUMENTS

2005/0147177 A1* 7/2005 Seo .................... H04B 1/71055
375/267
2006/0270360 A1* 11/2006 Han ..................... H04B 7/0626
455/69
2010/0232538 A1* 9/2010 Watanabe ............ H04B 7/0626
375/267
2011/0134903 A1* 6/2011 Ko ....................... H04B 7/0613
370/344
2011/0261805 A1* 10/2011 Landry, Jr. .............. G01S 19/24
370/342
2012/0045019 A1 2/2012 Li et al.

* cited by examiner

VECTOR SELECTION MODULATION-BASED MULTI-ANTENNA TRANSMISSION METHOD, RECEIVING METHOD AND DEVICE

TECHNICAL FIELD

The present invention relates to the wireless communication system, and in particular, to a multi-antenna transmission method for vector selection modulation and apparatus, and a data receiving method and apparatus.

BACKGROUND OF THE RELATED ART

With the development of the communication technology, people have put forward the increasingly high demand for the capacity of the communication system, and in the next several years, the demand for the system capacity will be doubled and redoubled. On one hand, it is difficult for the high order modulation and the high coding rate to confront the influence caused by the channel fading in the wireless transmission, and on the other hand, although the application of the multi-antenna technology can make the transmission capacity of the system increase exponentially, it puts forward much higher demand for the complexity of the communication device at the same time. Especially in the system of the fast varying channel, the feedback of the User Equipment (UE) often fails because of the factor, such as, the time delay, etc., and in this case it can only be solved by the open loop technology.

The open loop transmission technology involved in the Long Term Evolution/Long Term Evolution-Advanced (LTE/LTE-A) at present mainly includes the open loop diversity and the open loop pre-coding technology. The open loop diversity technology can better confront the channel fading, but in order to obtain the high diversity gain effect, it is often got in return by sacrificing the transmission efficiency, so it is unable to meet the demand of the system capacity. While for the transmission mode of the Bell Labs layered Space-Time (BLAST), on one hand, the characteristic of the channel is not considered, and the number of the receiving antennas is required to be greater than or equal to the number of the transmitting antennas, and under the relevant channel, the correlation of the channel will cause the serious interference produced among different data flows (or different layers) in different transmitting antennas. Although the open loop pre-coding technology can realize the parallel transmission of multiple data flows (or multiple layers) and it can realize dynamically adjusting the number of the transmitted data flows (or layers) according to the characteristic of the channel, and the pre-coding weight is polling used by a preset mode or obtained by a random selection mode, and the characteristic of the channel cannot be efficiently used.

Another transmission technology put forward in recent years is the space modulation technology, and its basic principle is to dynamically select the transmitting antenna according to the bit information to be transmitted, thus utilizing different transmitting antennas to transmit certain data information, however, the described scheme is only suitable for the transmission of single data flow (layer), and the whole efficiency of the open loop Multiple-Input Multiple-Output (MIMO) system cannot be fully developed.

SUMMARY OF THE INVENTION

The technical problem that the present invention requires to solve is to provide a vector selection modulation-based multi-antenna transmission method and apparatus, a data receiving method and apparatus, which can further improve the spectrum efficiency of the system without increasing the system complexity.

In order to solve the above-mentioned problem, the present invention provides a vector selection modulation-based multi-antenna transmission method, comprising:

for a group of data to be transmitted, using part of bit information in the group of data to select a weight corresponding to the group of data from K preconfigured weights, performing constellation mapping modulation on the residual bit information in the group of data, and using the selected weight corresponding to the group of data to perform weighted processing on the group of data after the constellation mapping modulation, wherein, the K is a natural number.

The above-mentioned method can further have the following characteristics: the step of using part of bit information in the group of data to select a weight corresponding to the group of data from K preconfigured weights, performing constellation mapping modulation on the residual bit information in the group of data, and using the selected weight corresponding to the group of data to perform weighted processing on the group of data after the constellation mapping modulation comprises:

dividing said group of data into multiple subgroups, for each subgroup, using part of bit information of the subgroup of data to select one weight corresponding to the subgroup of data from the K preconfigured weights, performing the constellation mapping modulation on the residual bit information of the subgroup of data, and using the weight corresponding to the subgroup of data to perform weighted processing on the subgroup of data after the constellation mapping modulation;

or, using part of the bit information in the group of data to select one weight corresponding to the group of data from the K preconfigured weights, performing the constellation mapping modulation on the residual bit information in the group of data, and using said one weight corresponding to the group of data to perform weighted processing on the group of data after the constellation mapping modulation.

The above-mentioned method can further have the following characteristics: the selected weight is one of the following: vector, matrix, subset of vector, subset of matrix.

The above-mentioned method can further have the following characteristics: the K weights are mutually orthogonal to each other, or, a correlation among the K weights is lower than a preset threshold value.

The above-mentioned method can further have the following characteristics: the step of performing the constellation mapping modulation by using the residual bit information of the group or subgroup of data comprises:

according to a number of layers and a weight selection granularity corresponding to the group of data to be transmitted, mapping the residual bit information as the number of layers multiplied by constellation mapping modulation symbols, the number of the constellation mapping modulations symbols is the weight selection granularity corresponding to the group of data;

or, according to a number of layers and a weight selection granularity corresponding to each subgroup of data to be transmitted, mapping residual bit information of the subgroup of data as the number of layers multiplied by constellation mapping modulation symbols, the number of the constellation mapping modulations symbols is the weight selection granularity corresponding to the subgroup of data;

wherein, the weight selection granularity represents the weight corresponding to the group of data or subgroup of data used by every J symbols or subcarriers, and J is a natural number.

The above-mentioned method can further have the following characteristics: each selected weight is selected by using $\lfloor \log_2(K) \rfloor$ j bit information.

The above-mentioned method can further have the following characteristics: the group of data or subgroup of data corresponding to each selected weight includes m=M*L*J+$\lfloor \log_2(K) \rfloor$ bits, M is the number of the bits carried by each constellation mapping modulation symbol, L is a number of layers corresponding to the group of data or subgroup of data, J is the weight selection granularity, wherein, the weight selection granularity represents the weight corresponding to the group of data or subgroup of data used by every J symbols or subcarriers, and J is an integer greater than 0, M is an integer greater than 0, L is an integer greater than 0.

The above-mentioned method can further have the following characteristics: the group of data or subgroup of data corresponding to each selected weight includes m=M*L*J+$\lfloor \log_2(K) \rfloor$+$\lfloor \log_2(N) \rfloor$ bits, M is the number of the bits carried by each constellation mapping modulation symbol, L is the number of layers corresponding to the group of data or subgroup of data, J is the weight selection granularity, wherein, the weight selection granularity represents the weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0.

The above-mentioned method can further have the following characteristics: the group of data or subgroup of data corresponding to each selected weight includes m=M*L*J+$\lfloor \log_2(K \cdot N) \rfloor$ bits, M is the number of the bits carried by each constellation mapping modulation symbol, L is a number of layers corresponding to the group of data or the subgroup of data, J is the weight selection granularity, wherein, the weight selection granularity represents the weight corresponding to the group of data or subgroup of data used by every J symbols or subcarriers, J is an integer greater than 0, M is an integer greater than 0, L is an integer greater than 0, and N is a number of selectable antenna groups in selection and modulation of grouping antennas, N is an integer greater than 0; and the step of using part of the bit information in the group of data or subgroup of data to select a corresponding weight from K preconfigured weights comprises:

using the $\lfloor \log_2(K \cdot N) \rfloor$ bit information in the group of data or the subgroup of data to select the weight corresponding to the group of data or the subgroup of data from the K preconfigured weights and select an antenna group corresponding to the group of data or subgroup of data from N groups of antennas.

The above-mentioned method can further have the following characteristics: the step of a selection mode of selecting the weight corresponding to the group of data or the subgroup of data from the K preconfigured weights comprises:

in different time slots/symbols/subframes/radio frames, same $\lfloor \log_2(K) \rfloor$ bit corresponding to same or different weights;

under different cell identities, same $\lfloor \log_2(K) \rfloor$ bit corresponding to same or different weights, wherein, the cell identities are particular IDs of terminals or particular identities of cells.

The above-mentioned method can further have the following characteristics: a pilot signal corresponding to the group of data to be transmitted is a pilot signal without precoding processing; or, a pilot signal corresponding to the group of data to be transmitted is a pilot signal after going through precoding processing.

The present invention further provides a vector selection modulation-based multi-antenna data receiving method, comprising:

after a receiver receives a signal, matching in K preconfigured weights and determining a weight used by a sender, obtaining a data bit corresponding to the signal according to the determined weight, and then performing a constellation mapping modulation judgment.

The above-mentioned method can further have the following characteristics: the step of matching in K preconfigured weights and determining a weight used by a sender comprises:

according to a channel coefficient, obtaining a receiving weight $W_r$, further obtaining a judgment signal $\tilde{r}=W_r y$, wherein, y is a receiving signal; selecting weights from the K preconfigured weights respectively to match with the judgment signal, and finding out a weight with a maximum characteristic as the weight used by the sender.

The present invention further provides a vector selection modulation-based multi-antenna transmission apparatus, comprising:

a weight selection module, configured to: for a group of data to be transmitted, use part of bit information in the group of data to select a weight corresponding to the group of data from K preconfigured weights;

a mapping module, configured to: perform constellation mapping modulation on residual bit information in the group of data;

a weighting module, configured to: use the weight selected by the weight selection module to perform weighted processing on the group of data after the constellation mapping modulation, wherein, the K is a natural number.

The above-mentioned apparatus can further have the following characteristics: the weight selection module uses part of bit information in the group of data to select a weight corresponding to the group of data from K preconfigured weights by the following mode:

dividing said a group of data into multiple subgroups, for each subgroup, using part of bit information of the subgroup of data to select one weight corresponding to the subgroup of data from K preconfigured weights; or using part of bit information in the group of data to select one weight corresponding to the group of data from K preconfigured weights;

the mapping module performs the constellation mapping modulation on the residual bit information of the subgroup of data, comprising:

performing the constellation mapping modulation on the residual bit information, on which the weight selection has been performed, in each subgroup of data; or, performing the constellation mapping modulation on the residual bit information, on which the weight selection has been performed, in the group of data; and the weighting module uses the weight selected by the weight selection module to perform weighted processing on the data on which the constellation mapping modulation has been performed by the following mode:

using the weight corresponding to each subgroup of data to perform weighted processing on the subgroup of data on which the constellation mapping modulation has been performed; or using said one weight corresponding to the group of data to perform weighted processing on the group of data on which the constellation mapping modulation has been performed.

The above-mentioned apparatus can further have the following characteristics: the selected weight is one of the following: vector, matrix, subset of vector, subset of matrix.

The above-mentioned apparatus can further have the following characteristics: the K weights are mutually orthogonal to each other, or, an correlation among the K weights is lower than a preset threshold value.

The above-mentioned apparatus can further have the following characteristics: the performing the constellation mapping modulation by using the residual bit information of the group or subgroup of data is by the following mode:

according to a number of layers and a weight selection granularity corresponding to the group of data to be transmitted, mapping the residual bit information as the number of layers multiplied by constellation mapping modulation symbols, the number of the constellation mapping modulations symbols is the weight selection granularity corresponding to the group of data;

or, according to a number of layers and a weight selection granularity corresponding to each subgroup of data to be transmitted, mapping the residual bit information of the subgroup of data as the number of layers multiplied by constellation mapping modulation symbols, the number of the constellation mapping modulations symbols is the weight selection granularity corresponding to the subgroup of data;

wherein, the weight selection granularity represents a weight corresponding to the group of data or subgroup of data used by every J symbols or subcarriers, and J is a natural number.

The above-mentioned apparatus can further have the following characteristics: each selected weight is selected by using $\lfloor \log_2(K) \rfloor$ bit information.

The above-mentioned apparatus can further have the following characteristics: the group of data or the subgroup of data corresponding to each selected weight includes $m=M*L*J+\lfloor \log_2(K) \rfloor$ bits, M is the number of the bits carried by each constellation mapping modulation symbol, L is a number of layers corresponding to the group of data or the subgroup of data, J is the weight selection granularity, wherein, the weight selection granularity represents a weight corresponding to the group of data or subgroup of data used by every J symbols or subcarriers, and J is an integer greater than 0, M is an integer greater than 0, and L is an integer greater than 0.

The above-mentioned apparatus can further have the following characteristics: the group of data or the subgroup of data corresponding to each selected weight includes $m=M*L*J+\lfloor \log_2(K) \rfloor+\lfloor \log_2(N) \rfloor$ bits, M is the number of the bits carried by each constellation mapping modulation symbol, L is a number of layers corresponding to the group of data or the subgroup of data, J is the weight selection granularity, wherein, the weight selection granularity represents a weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0.

The above-mentioned apparatus can further have the following characteristics: the group of data or the subgroup of data corresponding to each selected weight includes $m=M*L*J+\lfloor \log_2(K \cdot N) \rfloor$ bits, M is the number of the bits carried by each constellation mapping modulation symbol, L is a number of layers corresponding to the group of data or the subgroup of data, J is the weight selection granularity, wherein, the weight selection granularity represents a weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0; and the weight selection module uses part of the bit information in the group of data or the subgroup of data to select a corresponding weight from K preconfigured weights by the following mode:

using the bit information $\lfloor \log_2(K \cdot N) \rfloor$ in the group of data or the subgroup of data to select the weight corresponding to the group of data or subgroup of data from the K preconfigured weights and select an antenna group corresponding to the group of data or subgroup of data from N groups of antennas.

The above-mentioned apparatus can further have the following characteristics: a selection mode of the weight selection module selecting the weight corresponding to the group of data or the subgroup of data from K preconfigured weights by the following mode is:

in different time slots/symbols/subframes/radio frames, same $\lfloor \log_2(K) \rfloor$ bit corresponding to same or different weights;

under different cell identities, same $\lfloor \log_2(K) \rfloor$ bit corresponding to same or different weights, wherein, the cell identities are particular IDs of terminals or particular identities of cells.

The above-mentioned apparatus can further have the following characteristics: the apparatus further comprises: a pilot transmission module, configured to: regard a pilot signal without precoding processing as a pilot signal corresponding to the group of data to be transmitted for transmission; or, configured to: regard a pilot signal after going through precoding processing as a pilot signal corresponding to the group of data to be transmitted for transmission.

The present invention further provides a vector selection modulation-based multi-antenna data receiving apparatus, comprising:

a weight judgment module, configured to: after receiving a signal, match in K preconfigured weights and determine a weight used by a sender, obtain a data bit corresponding to the signal according to the determined weight; and a constellation mapping judgment module, configured to: perform a constellation mapping modulation judgment after the weight judgment module determines the weight and obtains the data bit corresponding to the signal.

The above-mentioned apparatus can further have the following characteristics: the weight judgment module matches in K preconfigured weights and determines a weight used by a sender by the following mode:

according to a channel coefficient H, obtaining a receiving weight $W_r$, further obtaining a judgment signal $\tilde{r}=W_r y$, wherein, y is a receiving signal; selecting weights from the K preconfigured weights respectively to match with the judgment signal, and finding out a weight with a maximum characteristic as the weight used by the sender.

Based on the transmission mode described in the present invention, it can overcome the defect that the space modulation technology can only transmit the single data flow (or layer) at the transmission efficiency aspect on one hand, and can select the weight through the information of the group of data in the situation that the number of the transmitting antennas does not increase, which can both improve the transmission efficiency and further increase the effect of the space diversity at the same time. In addition, it can avoid the problem of increasing the complexity of the codebook design in the large-scale array of antenna configurations. The method described based on the present invention can improve the spectrum efficiency of the system greatly in the situation without increasing the transmitting antenna.

PREFERRED EMBODIMENTS OF THE PRESENT INVENTION

Figure 1:
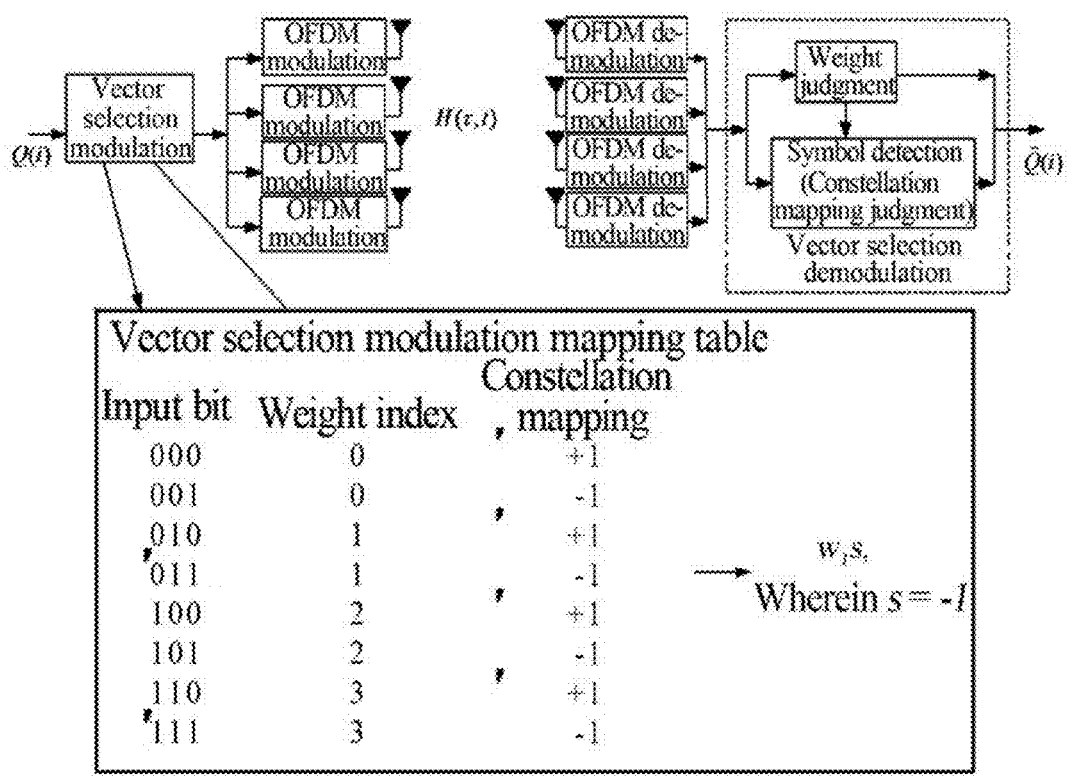
FIG. 1 is a vector selection modulation diagram under a situation that each transmission block is corresponding to one data flow (layer) (taking that a candidate weight is 4 and BPSK constellation mapping is adopted as an example)

In order to make the objective, technical scheme and advantage of the present invention much more clear and obvious, the embodiment of the present invention is described in detail with reference to the accompanying drawings hereinafter. It should be illustrated that, in the case of not conflicting, the embodiments in the present application and features in these embodiments can be combined with each other at random.

In the present invention, one transmission block is corresponding to one or more channel coding data blocks, and the data of one transmission block can be mapped to one or more space sub-channels for the parallel transmission, wherein, the data transmitted in each space sub-channel are called one data flow (or layer).

In the embodiment of the present invention, $(\cdot)^*$ represents conjugate transpose, $(\cdot)^T$ represents transpose, $\|\ \|$ represents a norm, and $\lfloor\ \rfloor$ represents round down.

The embodiment of the present invention provides a vector selection modulation-based multi-antenna transmission method, including:

for a group of data to be transmitted, using part of bit information in the group of data to select a weight corresponding to the group of data from K preconfigured weights, performing constellation mapping modulation on residual bit information in the group of data, and using the selected weight corresponding to the group of data to perform weighted processing on the group of data on which the constellation mapping modulation has been performed, wherein, the K is a natural number.

The step of using part of bit information in the group of data to select a weight corresponding to the group of data from K preconfigured weights, performing constellation mapping modulation on residual bit information in the group of data, and using the selected weight corresponding to the group of data to perform weighted processing on the group of data on which the constellation mapping modulation has been performed includes:

dividing a group of data into multiple subgroups, for each subgroup, using part of bit information of the subgroup of data to select a weight corresponding to the subgroup of data from K preconfigured weights, performing the constellation mapping modulation on residual bit information of the subgroup of data, and using the weight corresponding to the subgroup of data to perform weighted processing on the subgroup of data on which the constellation mapping modulation has been performed;

or, using part of the bit information in the group of data to select one weight corresponding to the group of data from K preconfigured weights, performing the constellation mapping modulation on the residual bit information in the group of data, and using said one weight corresponding to the group of data to perform weighted processing on the group of data on which the constellation mapping modulation has been performed.

The selected weight is one of the following: vector, matrix, subset of vector, subset of matrix.

Wherein, the K weights are mutually orthogonal to each other, or, an correlation among the K weights is lower than a preset threshold value. Wherein, the number of the receiving antennas is greater than or equal to the number of the transmitting antennas. Preferably, the K meets that $\log_2(K)$ is a positive integer.

Wherein, the step of performing the constellation mapping modulation by using the residual bit information includes:

according to the number of layers and a weight selection granularity corresponding to the group of data to be transmitted, mapping the residual bit information as the number of layers multiplied by constellation mapping modulation symbols, the number of which is the weight selection granularity;

or, according to the number of layers and a weight selection granularity corresponding to each subgroup of data to be transmitted, mapping the residual bit information of the subgroup of data as the number of layers multiplied by the constellation mapping modulation symbols, the number of which is the weight selection granularity;

wherein, the weight selection granularity represents a weight corresponding to the group of data or subgroup of data used by every J symbols or subcarriers, and J is a natural number.

Wherein, each selected weight is selected by using $\lfloor\log_2(K)\rfloor$ bit information.

Wherein, the group of data or the subgroup of data corresponding to each selected weight includes $m = M*L*J + \lfloor\log_2(K)\rfloor$ bits, M is the number of the bits carried by each constellation mapping modulation symbol, L is the number of layers corresponding to the group of data or the subgroup of data, J is the weight selection granularity, wherein, the weight selection granularity represents the weight corresponding to the group of data or subgroup of data used by every J symbols or subcarriers, and J is a natural number.

Or, the group of data or the subgroup of data corresponding to each selected weight includes $m=M*L*J+\lfloor \log_2(K) \rfloor + \lfloor \log_2(N) \rfloor$ bits, and N is the number of selectable antenna groups in selection and modulation of grouping antennas.

Or, the group of data or the subgroup of data corresponding to each selected weight includes $m=M*L*J+\lfloor \log_2(K \cdot N) \rfloor$ bits.

The step of using part of the bit information in the group of data or the subgroup of data to select a corresponding weight from K preconfigured weights includes:

using the $\lfloor \log_2(K \cdot N) \rfloor$ bit information in the group of data or the subgroup of data to select the weight corresponding to the group of data or the subgroup of data from the K preconfigured weights and select an antenna group corresponding to the group of data or the subgroup of data from N groups of antennas.

Wherein, the step of a selection mode of selecting the weight of the group of data or subgroup of data from K preconfigured weights includes:

in different time slots/symbols/subframes/radio frames, same $\lfloor \log_2(K) \rfloor$ bit corresponding to same or different weights;

under different cell identities, same $\lfloor \log_2(K) \rfloor$ bit corresponding to same or different weights, wherein, the cell identities are particular IDs of terminals or particular identities of the cells.

Wherein, a pilot signal corresponding to the group of data to be transmitted is a pilot signal without precoding processing; or, a pilot signal corresponding to the group of data to be transmitted is a pilot signal after going through precoding processing. Wherein, when the number of symbols that the weight selected by each group of weight selection bits performs the precoding (or each subcarrier or resource element of each OFDM symbol) is less than a preset threshold, preferably, it is transmitted based on the pilot signal without the precoding processing; when the number of symbols that the weight selected by each group of weight selection bits performs the precoding (or each subcarrier or resource element of each OFDM symbol) is greater than or equal to a preset threshold, preferably, it is transmitted based on the pilot signal after going through precoding processing; wherein, the precoding weight used by the pilot at this moment is the weight selected by the weight selection bits.

An example of a vector selection modulation is as follows:

for each symbol (such as, each symbol/each subcarrier in the OFDM system, or each resource element (RE) in the OFDM system), the weight selection is performed by using the $\lfloor \log_2(K) \rfloor$ bit information, and the constellation mapping modulation symbol of each layer is determined by using the M*L bit information, wherein, M represents the number of bits carried by each constellation mapping modulation symbol, and L represents the number of the data flows (or layers) to which the current transmission block is mapped.

For example, the data bit information to be transmitted $b_0, b_1, b_2, \ldots b_n$ is converted to a matrix Q(i), wherein, Q(i) is a matrix with m×n dimension, m represents the total number of bits carried by each symbol (or each symbol on each sub-channel in the OFDM system) and n represents the number of symbols (or the number of subcarriers in the OFDM system) allocated in the current transmission. In the situation that the constellation mapping modulation mode M (M represents the number of the bits carried by each constellation mapping modulation symbol) is given, $m=M*L+\lfloor \log_2(K) \rfloor$, wherein, L is the number of layers corresponding the data bits to be transmitted. Here, the data bit information to be transmitted $b_0, b_1, b_2, \ldots b_n$ is equivalent to one group of data to be transmitted, each column of data of the matrix Q(i) are equivalent to one subgroup of data, and the matrix includes n subgroups altogether.

Furthermore, the mode can be applied to the selection and modulation of grouping antennas, to combine the selection and modulation of grouping antennas with the vector selection modulation, specifically:

the data bit information to be transmitted $b_0, b_1, b_2, \ldots b_n$ is converted to a matrix Q(i), wherein, Q(i) is a matrix with m×n dimension, m represents the total number of the bits carried by each symbol (or each symbol on each sub-channel in the OFDM system) and n represents the number of the symbols (or the number of subcarriers in the OFDM system) allocated in the current transmission. In the situation that the constellation mapping modulation mode M (M represents the number of the bits carried by each constellation mapping modulation symbol) is given, $m=M*L+\lfloor \log_2(K*N) \rfloor$, or $m=M*L+\lfloor \log_2(K) \rfloor + \lfloor \log_2(N) \rfloor$, wherein, L is the number of layers corresponding the data bits to be transmitted, and N represents the number of selectable antenna groups in selection and modulation of grouping antennas.

Without loss of generality, besides the grouping mode of the above-mentioned bit information to be transmitted $b_0, b_1, b_2, \ldots b_n$, it also can be divided into the information of the weight selection part and the information of the constellation mapping modulation part according to other predefined modes, for example:

a), the bit information to be transmitted $b_0, b_1, b_2, \ldots b_n$, is divided into the bit block of the weight selection and the bit block of the constellation mapping modulation as per the proportion in advance according to the number of layers, the modulation mode, and the symbol (or the subcarrier or the resource element of the OFDM symbol) granularity of the weight selection, the quantity of the weight selection.

b), the extraction mode of the weight selection bit is defined according to the predefined rule and the information of the number of layers, the modulation mode, the symbol (or the subcarrier or the resource element of the OFDM symbol) granularity of the weight selection and the quantity of the weight selection, and part bits used for the weight selection are extracted from the transmission block.

The skills in the art can flexibly configure part bits used for the weight selection and the residual bits used for the constellation mapping modulation according to the real application.

The present invention is especially suitable for the case that the number of the transmitting antennas is far greater than the number of the receiving antennas.

The method can be used for perform transmission based on the pilot signal without the precoding processing. Also the transmission can be performed based on the pre-coding pilot signal. Now in the granularity of one same vector selection, the weights used by various symbols are the same, and they are the same with the weight used by corresponding pilot in the granularity.

Based on the method or system, it can further be combined with the transmission diversity, such as, the combination with the Space Frequency Block Coding/Space Time Block Coding (SFBC/STBC), the Time Switch Transmit Diversity (TSTD). When combining with the SFBC or the STBC, the SFBC/STBC diversity processing is performed at first, and the data after the diversity processing are regarded as the output of two data flows (layers), and the vector selection modulation is performed according to the above-mentioned mode, wherein, the weights on the symbols (or the resource elements) corresponding to one same group of the SFBC/STBC code are the same.

The mode can be combined with other open loop diversity modes, and other open loop diversity modes include but not limited to the SFBC (STBC), the CDD(PSD), and the FSTD/TSTD. Specifically, taking combination with the SFBC as the example, when combining with the SFBC, which is suitable for the situation of rank=1, the SFBC processing is performed at first, and later the Virtual Memory (VM) processing is performed according to the weight that the virutal rank is 2, wherein, the weights when two adjacent subcarriers perform the weight modulation are the same. When the combination with the SFBC is processed based on the Central Reservation System (CRS), the weight judgment is performed at first, and later the judgment of the constellation mapping modulation information is performed. When performing the weight judgment, the front and back two subcarriers can be jointly processed.

When the receiver performs the detection, it judges the weight of each symbol (or each symbol of each subcarrier in the OFDM system) at first, to obtain the information of $\lfloor \log_2(K) \rfloor$ bit, and further detects the modulation symbol information of each layer of the current codeword flow.

The embodiment of the present invention provides a vector selection modulation-based multi-antenna data receiving method, including:

after a receiver receives a signal, matching in K preconfigured weights and determining a weight used by a sender, obtaining a data bit corresponding to the signal according to the determined weight, and then performing a constellation mapping modulation judgment.

Wherein, the step of matching in K preconfigured weights and determining a weight used by a sender includes:

according to a channel coefficient H, obtaining a judgment signal $\tilde{r} = W_r y$, wherein, $W_r$ is a receiving weight and y is a receiving signal; selecting the weight from the K preconfigured weights respectively to match with the judgment signal, and finding out a weight with a maximum characteristic as the weight used by the sender.

The processing of the receiver is illustrated in detail hereinafter.

When the receives processes, the received signal is expressed as $y = Hw_i S + n$, wherein, H is the channel information, S is the constellation mapping modulation signal, $w_i$ is the weight selected according to the transmission bit, and the channel coefficient obtained by the receiver by using the pilot or other reference signals is H, and n is a noise.

The receiver performs the judgment of the weight at first, and it performs the detection through utilizing the channel coefficient H based on the receiving detection algorithm, such as, ZF, IRC, MMSE, MMSE-IRC, etc., at first, to obtain $\tilde{r} = W_r y$, wherein, $W_r$ is the receiving weight obtained according to the above-mentioned receiving algorithm. In the case without considering the noise and the interference and the channel estimation error, y=; when there is a noise or interference or the channel estimation error, $\tilde{r} = w_i S + \Delta$, and $\Delta$ represents the detection error.

For the judgment of the weight, the judgment signal $\tilde{r}$ is matched with different candidate weights respectively, and the weight with the maximum characteristic is found. The specific judgment method can be judged according to the following mode:

$$\maxarg_{w_k \in c}((w'_k \tilde{r})'(w'_k \tilde{r})) \text{ or, } \maxarg_{w_k \in c}(\text{Real}(\sum w'_k r \%)),$$

wherein, c is a set of the candidate weights.

Certainly, without considering the complexity, it also can be judged through the maximum likelihood, that is, $$\maxarg_{w_k \in c_1, x \in c_2} (\text{Real}(\sum w'_k r \%)), \text{ or } \maxarg_{w_k \in c_1, x \in c_2} (\text{Real}(\sum w'_k r \%)),$$

wherein, $c_1$ is a set of the candidate weights, and $c_2$ is a candidate constellation mapping modulation symbol.

The specific embodiments of the present invention are illustrated through the specific embodiments. Wherein, in embodiment 1 to embodiment 3, it is illustrated by taking the weight selection granularity J=1 as the example, and it is likewise applicable when J>1. Embodiment 4 illustrates the detailed processing procedure when the vector selection modulation combines with the SFBC/STBC. In the embodiment, L=1, and every two symbols/subcarriers adopt the same weight selection. Embodiment 5 illustrates the application processing procedure under the situation of the selection and modulation of grouping antennas+the vector selection modulation. Embodiment 6 further illustrates the diagram when the weight selection granularity combines with the multiple layer transmission and antenna selection modulation, etc.

Embodiment 1

In the situation that the transmission block is corresponding to 1 data flow (or layer), as shown in FIG. 1, Q(i) is a matrix of m×n dimension, and $m = M + \lfloor \log_2(K) \rfloor$ at this moment, wherein, M is the number of bits carried by each constellation mapping modulation symbol, by taking the size of the weight set K=4 and adopting the BPSK modulation as the example. The m=3 bit information is carried and transmitted in each symbol (or resource element), and the transmission efficiency is 3 times of that of the tradition BPSK system with 1 data flow (or layer). Wherein, the weight selection modulation carries the information of 2 more bits on each symbol.

Embodiment 2

Figure 2:
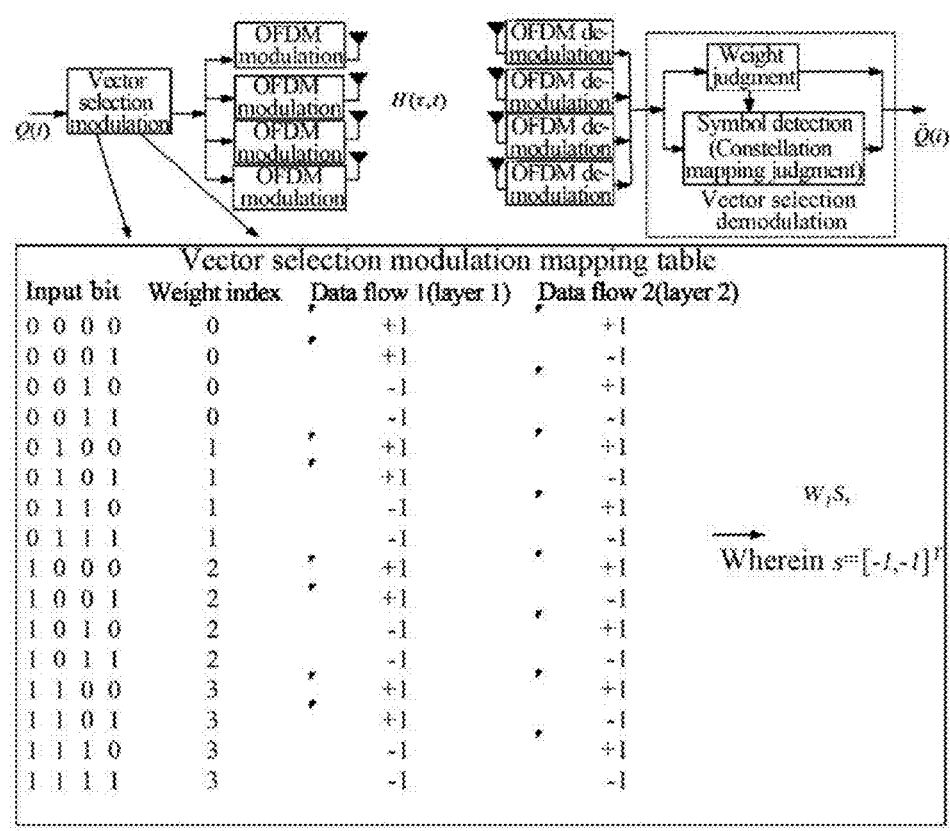
FIG. 2 is a vector selection modulation diagram under a situation that each transmission block is corresponding to two data flows (layers) (taking that a candidate weight is 4 and BPSK constellation mapping is adopted as an example)
Figure 3:
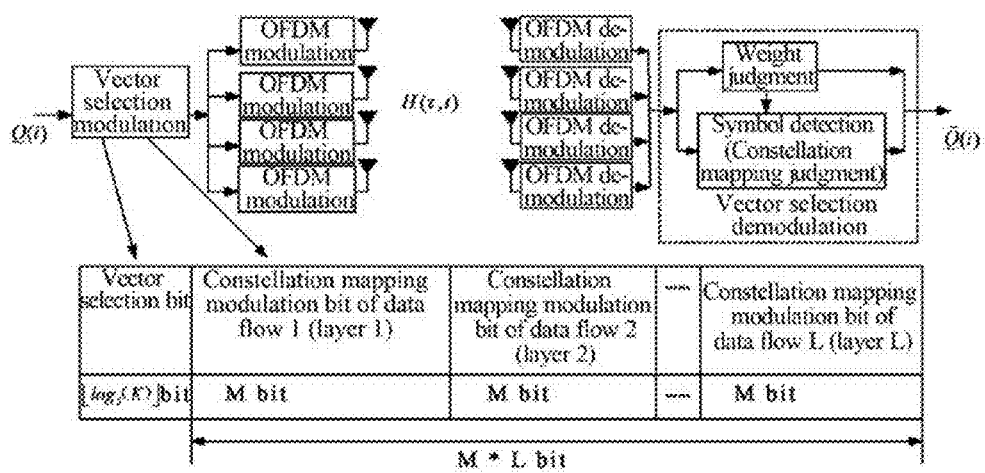
FIG. 3 is a vector selection modulation diagram under a situation that each transmission block is corresponding to L data flows (layers) (taking that a candidate weight is K and each constellation mapping point carries M bits during constellation mapping as an example)

In the mode of the embodiment 1, the transmission block only corresponds to 1 data flow, while in the multi-antenna system, in order to further improve the space transmission efficiency of the multi-antenna system, it will often adopt the situation that each transmission block is corresponding to more data flows (layers). FIG. 2 shows the diagram of the vector selection modulation mode based on the transmission of multiple data flows. Now Q(i) is a matrix of m×n dimension, and $m = 2M + \lfloor \log_2(K) \rfloor$ at this moment, wherein, M is the number of bits carried by each constellation mapping modulation symbol, by taking the size of the weight set K=4 and adopting the BPSK modulation as the example. The m=4 bit information is carried and transmitted in each symbol (or resource element), and the transmission efficiency is 2 times of that of the tradition BPSK system with 2 data flows (or layers).

Embodiment 3

In embodiment 3, the method according to the present invention provides a general system framework diagram, when in the adopted constellation mapping modulation, each modulation symbol is corresponding to Mbit and the transmission block is corresponding to the parallel transmission of L data flows, the number of bits transmitted corresponding to every symbol (or resource element) is m=M*L+$\lfloor \log_2(K) \rfloor$ bit; wherein, $\lfloor \log_2(K) \rfloor$ bit is used for the vector selection modulation, and M*L is the number of bits corresponding to the M constellation mapping modulation modes adopted in L layers. Compared with the traditional L data flows, in the system of M constellation mapping modulations, each symbol (or resource element) transmits $\lfloor \log_2(K) \rfloor$ bit information more.

Embodiment 4

Figure 4:
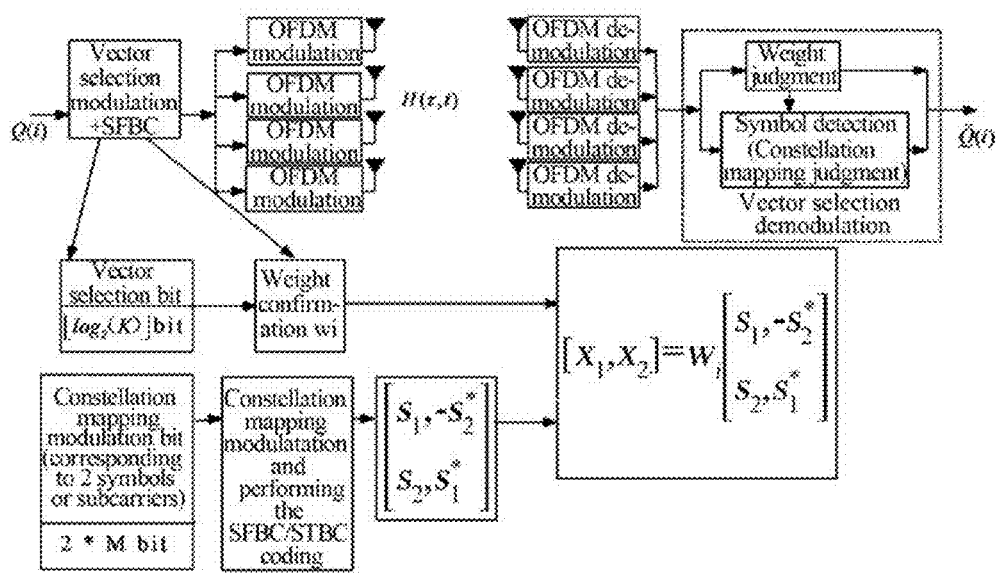
FIG. 4 is a combination diagram of a vector selection modulation and an SFBC (STBC) transmission technology.

FIG. 4 is a combination diagram of the vector selection modulation and the SFBC/STBC. In the embodiment, every two symbols (resource element) configure the same weight, so the number of bits transmitted by every two symbols is 2M+$\lfloor \log_2(K) \rfloor$.

Specifically, the constellation mapping modulation is performed on the 2M bit at first, to obtain two constellation mapping modulation symbols, $s_1$ and $s_2$, and the SFBC/STBC coding is performed on $s_1$ and $s_2$, to obtain $[s_1, s_2]^T$ and $[-s_2^*, s_1^*]^T$, and the vector selection modulation is performed by using $\lfloor \log_2(K) \rfloor$ bit information, to determine the corresponding weight $w_i$, and a pair of corresponding symbols after the SFBC/STBC coding are weighted respectively by using the weight to obtain $$w_i \begin{bmatrix} s_1, & -s_2^* \\ s_2, & s_1^* \end{bmatrix},$$

which is mapped to the corresponding symbol/subcarrier (on the resource element).

In the situation of combining with the SFBC, at the receiver, the SFBC coding for the signals received at the receiver are as follow respectively:

$y_1 = Hw_i[s_1, s_2]^T + n$ $y_2 = Hw_i[-s_2^*, s_1^*]^T + n$

If there are Nr receiving antennas at the receiver, in view of that the channel changes slowly in the interval of one SFBC/STBC coding pair, then $$[y_1, y_2^*]^T = \begin{bmatrix} Hw_{i,1,1} & Hw_{i,2,1} \\ M & M \\ Hw_{i,1,Nr} & Hw_{i,2,Nr} \\ Hw_{i,2,1}^* & Hw_{i,1,1}^* \\ M & M \\ Hw_{i,2,Nr}^* & Hw_{i,1,Nr}^* \end{bmatrix} [s_1, s_2]^T + n \quad (1)$$

It can be seen from the above formula, the detection of $[s_1, s_2]^T$ needs to be detected based on the equivalent channel, so it needs to obtain the equivalent channel at first, to make the channel coefficient information obtained by the receiver through estimation be $\tilde{H}$; it obtains the weight information according to the channel coefficient information at first, and performs the detection of $[s_1, s_2]^T$.

The weight used by each SFBC/STBC is the same, so $$Y = [y_1, y_2] = H_e \begin{bmatrix} s_1 & -s_2^* \\ s_2 & s_1^* \end{bmatrix} + n$$

The judgment of the weight $w_j$, $$\arg\max_{w_j \in C} \left( \frac{(\tilde{H}_{e,j})(\tilde{H}_{e,j})'}{\|(\tilde{H}_{e,j})(\tilde{H}_{e,j})'\|} - \frac{YY'}{\|YY'\|} \right),$$

wherein, $\|\ \|$ represents calculating the norm, to judge the $w_j$, wherein, $$\tilde{H}_{e,j} = \begin{bmatrix} \tilde{H}w_{j,1,1} & \tilde{H}w_{j,2,1} \\ \vdots & \vdots \\ \tilde{H}w_{j,1,Nr} & \tilde{H}w_{j,2,Nr} \end{bmatrix}$$

Because $YY' = (|s_1|^2 + |s_2|^2)H_e H_e'$, it can realize the weight judgment through the above formula.

Further, according to the weight obtained by the judgment, $\tilde{H}_e = \tilde{H}w_i$, is obtained, and the judgment of constellation point is performed by utilizing the SFBC/STBC decoding mode based on the formula (1).

Embodiment 5

Figure 5:
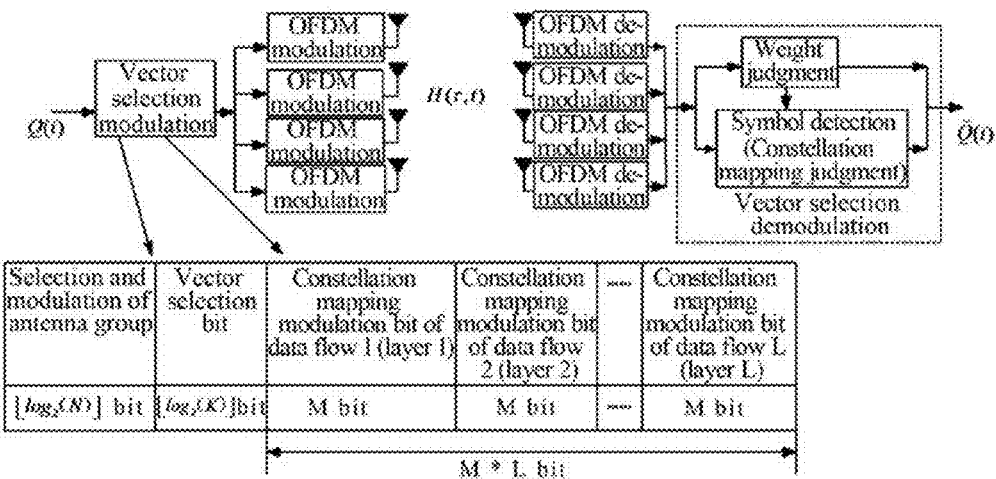
FIG. 5 is a joint-design diagram of an antenna selection modulation and a vector selection modulation.
Figure 6:
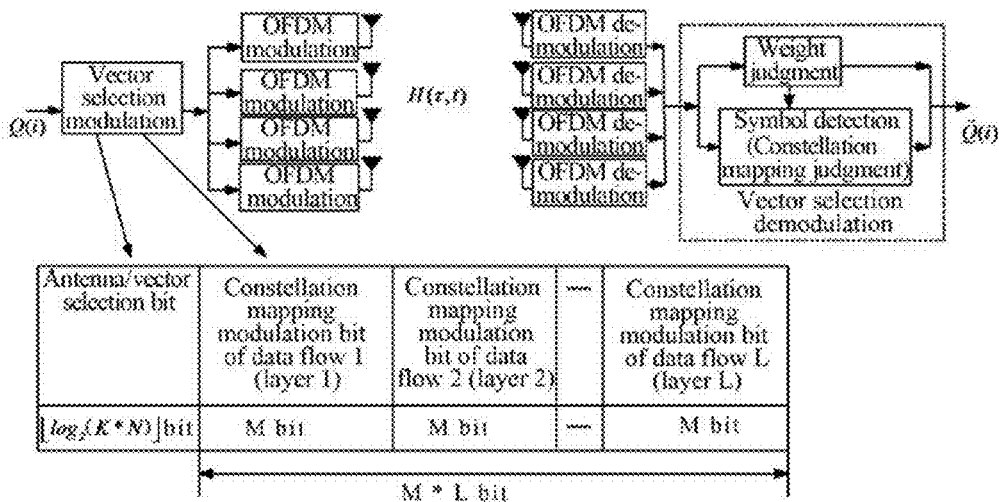
FIG. 6 is a joint-design diagram of an antenna selection modulation and a vector selection modulation.

The embodiment provides a transmission mode that the vector selection modulation combines with the selection and modulation of grouping antennas, and as shown in FIG. 5 and FIG. 6, taking the total number of the transmitting antennas being Nt as the example, Nt antennas are divided into N groups at first, then the number of the antennas in each group is Nt/N; if in the situation that the number of transmitting antennas is Nt, and the quantity of the corresponding codebook used for the vector selection modulation is K, then the antenna selection modulation and the vector selection modulation can carry $\lfloor \log_2(N) \rfloor (+) \lfloor \log_2 K \rfloor$ bit, as shown in FIG. 5; when the antenna selection modulation and the vector selection modulation are coded jointly, it can carry $\lfloor \log_2(N) \cdot K \rfloor$ bit, as shown in FIG. 6. When in the adopted constellation mapping modulation, each modulation symbol is corresponding to Mbit and the transmission block is corresponding to parallel transmission of L data flows, the number of bits transmitted corresponding to every symbol (or resource element) is m=M*L+$\lfloor \log_2(K \cdot N) \rfloor$ or m=M*L+$\lfloor \log_2(K) \rfloor + \lfloor \log_2(N) \rfloor$ bit; wherein, $\lfloor \log_2(K) \rfloor$ bit is used for the vector selection modulation, $\lfloor \log_2(N) \rfloor$ bit is used for the antenna group selection, and M*L is the number of bits corresponding to the M constellation mapping modulation modes adopted in L layers. When the antenna group selection and the vector selection are coded jointly, $\lfloor \log_2(K \cdot N) \rfloor$ bit is used for the combined antenna group selection and vector selection. Compared with the traditional L data flows, in the system of M constellation mapping modulations, each symbol (or resource element) transmits $\lfloor \log_2(K \cdot N) \rfloor$ or $\lfloor \log_2(K) \rfloor + \lfloor \log_2(N) \rfloor$ bit information more.

Meanwhile, when the large-scale array of antennas are used to transmit, because each transmission only uses part of antennas for transmission, the current codebook of antennas in the small and medium scale can be reused, which can reduce the complexity of the system design.

Embodiment 6

Figure 7:
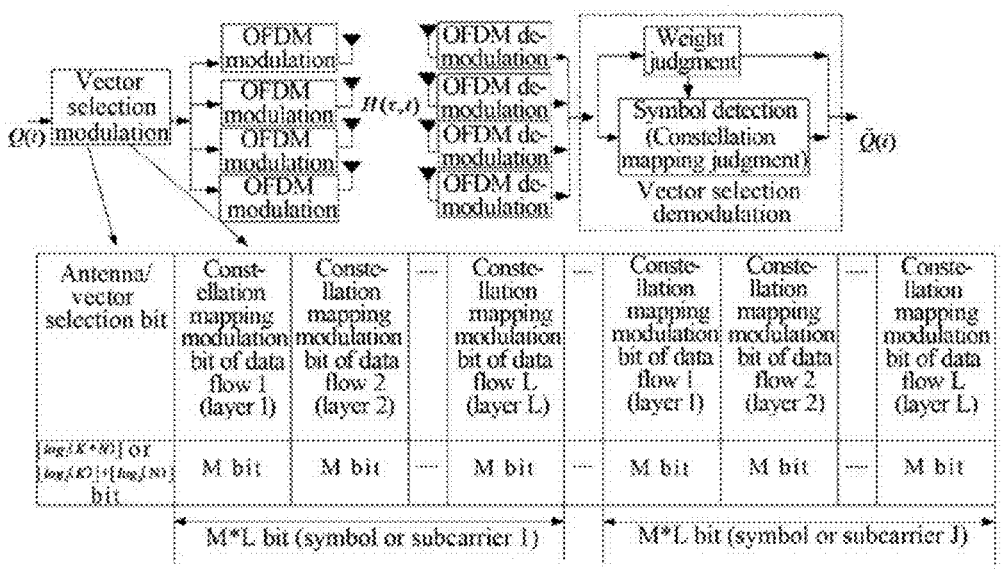
FIG. 7 is a combination diagram of a weight selection granularity and a multilayer transmission and an antenna selection modulation.

In the form when the weight selection has a certain granularity, the weight selection granularity is regarded as J, and the number of layers corresponding to the currently transmitted transmission block is L, and the number of the antenna selection groups is N, the diagram of the corresponding vector selection modulation is shown as in FIG. 7. In the embodiment, every J symbols/subcarriers/resource elements adopt the same weight. Still every modulation symbol is corresponding to Mbit. Then the number of bits transmitted corresponding to J symbols/subcarriers (or resource elements) is $m=M*L*J+\lfloor \log_2(K*N) \rfloor$ or $m=M*L*J+\lfloor \log_2(K) \rfloor+\lfloor \log_2(N) \rfloor$ bit, $M*L*J$ is the number of bits corresponding to J symbols (or subcarriers/resource elements) at L layers adopting M constellation mapping modulation modes. Compared the traditional L data flows, in the system of M constellation mapping modulations, J symbols (or subcarriers/resource elements) transmit $\lfloor \log_2(K*N) \rfloor$ (or $\lfloor \log_2(K) \rfloor+\lfloor \log_2(N) \rfloor$) bit information more. Wherein, $\lfloor \log_2(K*N) \rfloor$ and $\lfloor \log_2(K) \rfloor+\lfloor \log_2(N) \rfloor$ are respectively corresponding to the situation that the antenna group selection and the vector selection modulation adopt the joint coding and does not adopt the joint coding in embodiment 5.

Figure 8:
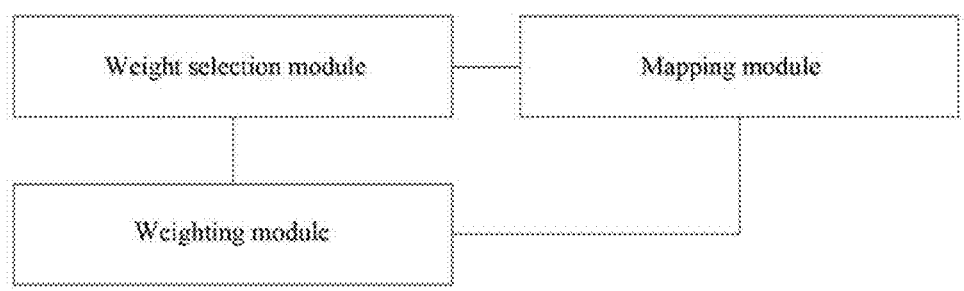
FIG. 8 is a block diagram of a vector selection modulation-based multi-antenna transmission apparatus according to an embodiment of the present invention.

The embodiment of the present invention further provides a vector selection modulation-based multi-antenna transmission apparatus, as shown in FIG. 8, including:

a weight selection module is configured to: for a group of data to be transmitted, use part of bit information in the group of data to select a weight corresponding to the group of data from K preconfigured weights;

a mapping module is configured to: perform constellation mapping modulation on residual bit information in the group of data, and a weighting module is configured to: use the weight selected by the weight selection module to process weighted processing on the group of data after the constellation mapping modulation, wherein, the K is a natural number.

Figure 9:
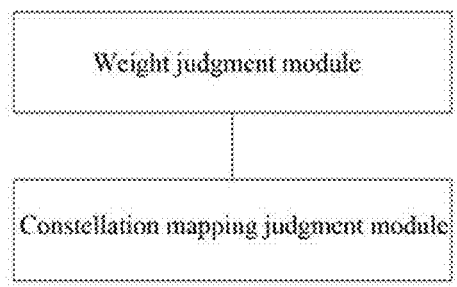
FIG. 9 is a block diagram of a vector selection modulation-based multi-antenna data receiving apparatus according to an embodiment of the present invention.

The embodiment of the present invention further provides a vector selection modulation-based multi-antenna data receiving apparatus, as shown in FIG. 9, including:

a weight judgment module is configured to: after receiving a signal, match in K preconfigured weights and determine a weight used by a sender, obtain a data bit corresponding to the signal according to the determined weight;

a constellation mapping judgment module is configured to: perform a constellation mapping modulation judgment after the weight judgment module determines the weight and obtains the data bit corresponding to the signal.

It needs to be illustrated that multiple details described in the above-mentioned method embodiment are also suitable for the apparatus embodiment, thus omitting the repeat description for the same or similar parts.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

The present invention provides a multi-antenna transmission method for a vector selection modulation under a multi-antenna system, and introduces the principle and the system design of the present invention through the embodiments. In the above-mentioned contents, those skilled in the art can make the corresponding modifications and variations and combination of different embodiments according to the present invention without departing from the spirit and essence of the present invention. All of modifications and variations without departing should be embodied in the protection scope of the appended claims of the present invention.

INDUSTRIAL APPLICABILITY

Based on the transmission mode described in the present invention, it can overcome the defect that the space modulation technology can only transmit the single data flow (or layer) at the transmission efficiency aspect on one hand, and can select the weight through the information of the group of data in the situation that the number of the transmitting antennas does not increase, which can both improve the transmission efficiency and further increase the effect of the space diversity at the same time. In addition, it can avoid the problem of increasing the complexity of the codebook design in the large-scale array of antenna configurations. The method described based on the present invention can improve the spectrum efficiency of the system greatly in the situation without increasing the transmitting antenna.

What is claimed is:

1. A vector selection modulation-based multi-antenna transmission method, comprising:
   for a group of data to be transmitted, using part of bit information in the group of data to select a weight corresponding to the group of data from preconfigured K weights;
   performing constellation mapping modulation on the residual bit information in the group of data; and
   using the selected weight corresponding to the group of data to perform weighted processing on the group of data after the constellation mapping modulation, wherein, the K is a natural number.

2. The method according to claim 1, wherein, the step of using part of bit information in the group of data to select a weight corresponding to the group of data from preconfigured K weights, performing constellation mapping modulation on the residual bit information in the group of data, and using the selected weight corresponding to the group of data to perform weighted processing on the group of data after the constellation mapping modulation comprises:
   dividing said group of data into multiple subgroups, for each subgroup, using part of bit information of the subgroup of data to select one weight corresponding to the subgroup of data from the preconfigured K weights, performing the constellation mapping modulation on the residual bit information of the subgroup of data, and using the weight corresponding to the subgroup of data to perform weighted processing on the subgroup of data after the constellation mapping modulation;

or, using part of the bit information in the group of data to select one weight corresponding to the group of data from the preconfigured K weights, performing the constellation mapping modulation on the residual bit information in the group of data, and using said one weight corresponding to the group of data to perform weighted processing on the group of data after the constellation mapping modulation.

3. The method according to claim 1, wherein, the selected weight is one of following: vector, matrix, subset of vector, subset of matrix;

or the K weights are mutually orthogonal to each other, or, a correlation among the K weights is lower than a preset threshold value.

4. The method according to claim 2, wherein, the step of performing the constellation mapping modulation by using the residual bit information of the group or subgroup of data comprises:

according to a number of layers and a weight selection granularity corresponding to the group of data to be transmitted, mapping the residual bit information as the number of layers multiplied by constellation mapping modulation symbols, the number of the constellation mapping modulation symbols is the weight selection granularity corresponding to the group of data;

or, according to a number of layers and a weight selection granularity corresponding to each subgroup of data to be transmitted, mapping the residual bit information of the subgroup of data as the number of layers multiplied by constellation mapping modulation symbols, the number of the constellation mapping modulation symbols is the weight selection granularity corresponding to the subgroup of data;

wherein, the weight selection granularity represents a weight corresponding to the group of data or subgroup of data used by every J symbols or subcarriers, and J is a natural number.

5. The method according to claim 2, wherein, each selected weight is selected by using $\lfloor \log_2(K) \rfloor$ bit information.

6. The method according to claim 5, wherein, the group of data or subgroup of data corresponding to each selected weight includes $m=M*L*J+\lfloor \log_2(K) \rfloor$ bits, and M is the number of bits carried by each constellation mapping modulation symbol, L is a number of layers corresponding to the group of data or subgroup of data, J is a weight selection granularity, wherein, the weight selection granularity represents a weight corresponding to the group of data or subgroup of data used by every J symbols or subcarriers, and J is an integer greater than 0, M is an integer greater than 0, L is an integer greater than 0;

or the group of data or subgroup of data corresponding to each selected weight includes $m=M*L*J+\lfloor \log_2(K) \rfloor + \lfloor \log_2(N) \rfloor$ bits, and M is the number of bits carried by each constellation mapping modulation symbol, L is a number of layers corresponding to the group of data or subgroup of data, J is a weight selection granularity, wherein, the weight selection granularity represents a weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0.

7. The method according to claim 2, wherein, the group of data or subgroup of data corresponding to each selected weight includes $m=M*L*J+\lfloor \log_2(K) \rfloor + \lfloor \log_2(N) \rfloor$ bits, and M is the number of bits carried by each constellation mapping modulation symbol, L is a number of layers corresponding to the group of data or subgroup of data, J is a weight selection granularity, wherein, the weight selection granularity represents a weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0; and the step of using part of the bit information in the group of data or the subgroup of data to select a corresponding weight from preconfigured K weights comprises:

using $\lfloor \log_2(K \cdot N) \rfloor$ bit information in the group of data or the subgroup of data to select the weight corresponding to the group of data or subgroup of data from said preconfigured K weights and select an antenna group corresponding to the group of data or subgroup of data from N groups of antennas.

8. The method according to claim 2, wherein, the step of a selection mode of selecting the weight corresponding to the group of data or subgroup of data from preconfigured K weights comprises:

in different time slots/symbols/subframes/radio frames, same $\lfloor \log_2(K) \rfloor$ bit corresponding to same or different weights;

under different cell identities, same $\lfloor \log_2(K) \rfloor$ bit corresponding to same or different weights, wherein, the cell identities are particular IDs of terminals or particular identities of cells;

or a pilot signal corresponding to the group of data to be transmitted is a pilot signal without precoding processing; or, a pilot signal corresponding to the group of data to be transmitted is a pilot signal after going through precoding processing.

9. A vector selection modulation-based multi-antenna transmission apparatus, comprising a processor, and a storage device for storing computer executable instructions, wherein:

a weight selection module, performed by the processor, using part of bit information in the group of data to select a weight corresponding to the group of data from preconfigured K weights for a group of data to be transmitted;

a mapping module, performed by the processor, performing constellation mapping modulation on the residual bit information in the group of data;

a weighting module, performed by the processor, using the weight selected by the weight selection module to perform weighted processing on the group of data after the constellation mapping modulation, wherein, the K is a natural number.

10. The apparatus according to claim 9, wherein, the weight selection module uses part of bit information in the group of data to select a corresponding weight from preconfigured K weights by either:

dividing said a group of data into multiple subgroups, for each subgroup, using part of bit information of the subgroup of data to select one weight corresponding to the subgroup of data from the preconfigured K weights; or using part of bit information in the group of data to select one weight corresponding to the group of data from the preconfigured K weights;

the mapping module performs the constellation mapping modulation on the residual bit information in the subgroup of data by either:

performing the constellation mapping modulation on the residual bit information, on which a weight selection has been performed, in each subgroup of data; or, performing the constellation mapping modulation on the residual bit information, on which a weight selection has been performed, in the group of data; and the weighting module uses the weight selected by the weight selection module to perform weighted processing on the data after the constellation mapping modulation by either:

using the weight corresponding to each subgroup of data to perform weighted processing on the subgroup of data after the constellation mapping modulation; or using said one weight corresponding to the group of data to perform weighted processing on the group of data after the constellation mapping modulation.

11. The apparatus according to claim 9, wherein,
the selected weight is one of following: vector, matrix, subset of vector, subset of matrix; or the K weights are mutually orthogonal to each other, or, a correlation among the K weights is lower than a preset threshold value.

12. The apparatus according to claim 10, wherein, the performing the constellation mapping modulation by using the residual bit information of the group or subgroup of data comprises either:

according to a number of layers and a weight selection granularity corresponding to the group of data to be transmitted, mapping the residual bit information as the number of layers multiplied by constellation mapping modulation symbols, the number of the constellation mapping modulation symbols is the weight selection granularity corresponding to the group of data;

or, according to a number of layers and a weight selection granularity corresponding to each subgroup of data to be transmitted, mapping the residual bit information of the subgroup of data as the number of layers multiplied by the constellation mapping modulation symbols, the number of the constellation mapping modulation symbols is the weight selection granularity corresponding to the subgroup of data;

wherein, the weight selection granularity represents a weight corresponding to the group of data or the subgroup of data used by every J symbols or subcarriers, and J is an integer greater than 0.

13. The apparatus according to claim 10, wherein, each selected weight is selected by using $\lfloor \log_2(K) \rfloor$ bit information.

14. The apparatus according to claim 13, wherein, the group of data or the subgroup of data corresponding to each selected weight includes $m=M*L*J+\lfloor \log_2(K) \rfloor$ j bits, and M is the number of bits carried by each constellation mapping modulation symbol, L is a number of layers corresponding to the group of data or subgroup of data, J is a weight selection granularity, wherein, the weight selection granularity represents a weight corresponding to the group of data or the subgroup of data used by every J symbols or subcarriers, and J is an integer greater than 0, M is an integer greater than 0, L is an integer greater than 0; or the group of data or the subgroup of data corresponding to each selected weight includes $m=M*L*J+\lfloor \log_2(K) \rfloor+\lfloor \log_2(N) \rfloor$ bits, and M is the number of bits carried by each constellation mapping modulation symbol, L is a number of layers corresponding to the group of data or subgroup of data, J is a weight selection granularity, wherein, the weight selection granularity represents a weight corresponding to the group of data or the subgroup of data used by every J symbols or sub carriers, and J is an integer greater than 0, M is an integer greater than 0, L is an integer greater than 0, and N is a number of selectable antenna groups in selection and modulation of grouping antennas, N is an integer greater than 0.

15. The apparatus according to claim 9, wherein,
the group of data or the subgroup of data corresponding to each selected weight includes $m=M*L*J+\lfloor \log_2(K \cdot N) \rfloor$ bits, M is the number of bits carried by each constellation mapping modulation symbol, L is a number of layers corresponding to the group of data or the subgroup of data, J is a weight selection granularity, wherein, the weight selection granularity represents a weight corresponding to the group of data or subgroup of data used by every J symbols or subcarriers, and J is an integer greater than 0, M is an integer greater than 0, L is an integer greater than 0, and N is a number of selectable antenna groups in selection and modulation of grouping antennas, N is an integer greater than 0; and the weight selection module uses part of the bit information in the group of data or the subgroup of data to select a corresponding weight from preconfigured K weights using $\lfloor \log_2(K \cdot N) \rfloor$ bit information in the group of data or the subgroup of data to select the weight corresponding to the group of data or subgroup of data from the preconfigured K weights and select an antenna group corresponding to the group of data or subgroup of data from N groups of antennas.

16. The apparatus according to claim 9, wherein, the weight selection module selects the weight corresponding to the group of data or the subgroup of data from the preconfigured K weights as follow:

in different time slots/symbols/subframes/radio frames, same $\lfloor \log(K) \rfloor$ bit corresponding to same or different weights;

under different cell identities, same $\lfloor \log_2(K) \rfloor$ bit corresponding to same or different weights, wherein, the cell identities are particular IDs of terminals or particular identities of cells;

or wherein, the apparatus further comprises: a pilot transmission module, performed by the processor, either taking a pilot signal without precoding processing as a pilot signal corresponding to the group of data to be transmitted; or, taking a pilot signal after going through precoding processing as a pilot signal corresponding to the group of data to be transmitted.

\* \* \* \* \*